No. 881,657. PATENTED MAR. 10, 1908.
C. BITTNER.
STUMP AND ROOT PULLER.
APPLICATION FILED APR. 20, 1907.
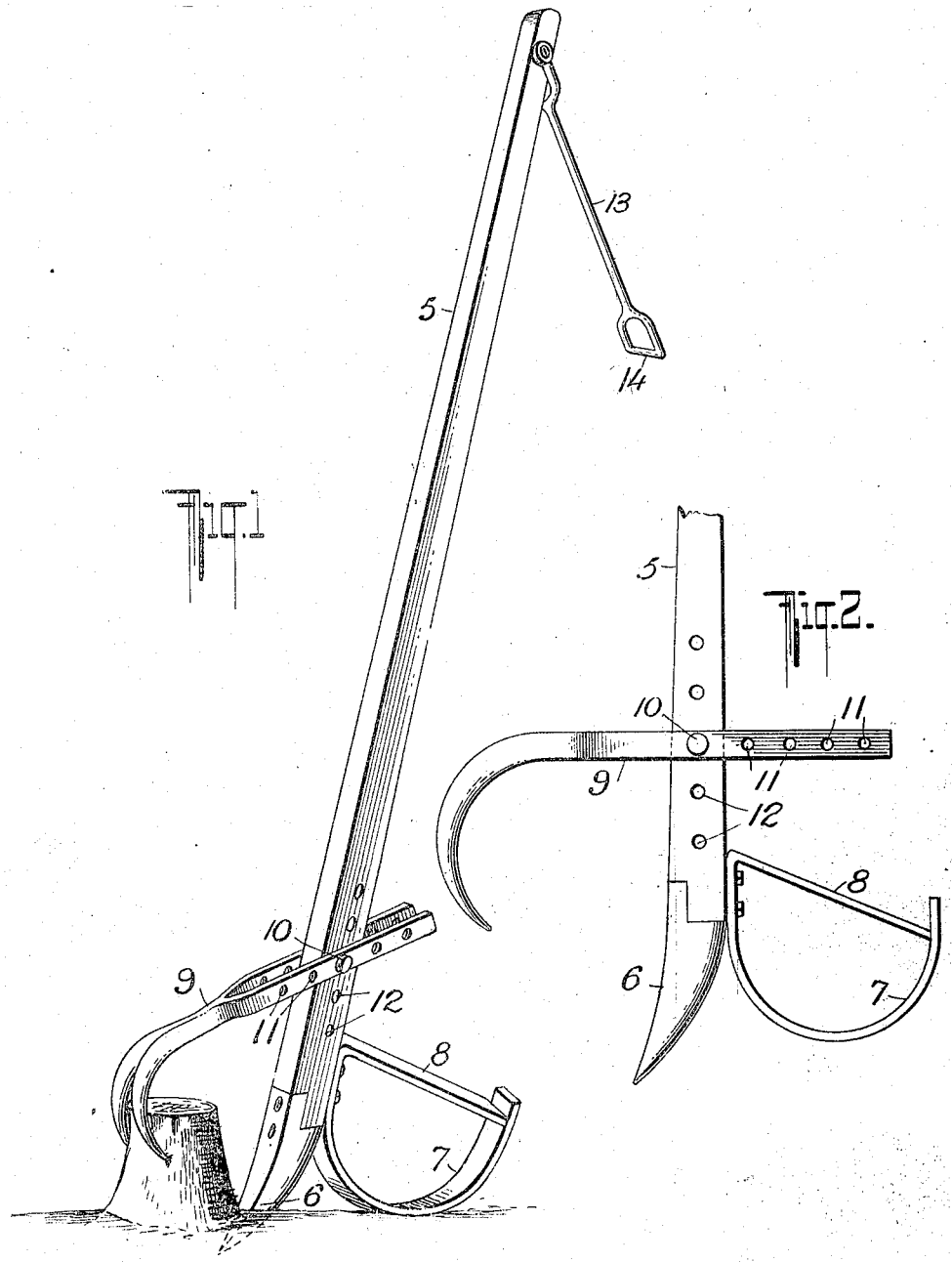
INVENTOR
Charles Bittner
BY
Victor J. Evans
ATTORNEY
WITNESSES
May W. Clinton

UNITED STATES PATENT OFFICE.

CHARLES BITTNER, OF NEW YORK, N. Y.

STUMP AND ROOT PULLER.

No. 881,657.　　　Specification of Letters Patent.　　Patented March 10, 1908.

Application filed April 20, 1907. Serial No. 369,281.

*To all whom it may concern:*

Be it known that I, CHARLES BITTNER, a subject of the German Emperor, residing at New York, in the county of New York and State of New York, have invented new and useful Improvements in Stump and Root Pullers, of which the following is a specification.

This invention relates to stumps and root pullers and to that class which is more particularly adapted to pull up and remove the stumps and roots of weeds and brush as will be more fully described in the following specification, set forth in the claims and illustrated in the drawing where it will be seen that like reference numerals are employed to designate the same parts in the several figures.

Figure 1 is a perspective view of the improved device in operation. Fig. 2 is an enlarged side view of the lower end of same.

The device is portable and adapted to be operated by a single person, being composed of a lever 5 somewhat higher than the operator for the purpose of affording greater leverage when at work and this lever at its lower end is provided with a metal spur or point 6 which either is forced into the stump to be removed or finds its way between the spreading roots to thereby engage the stump.

A short distance above the back of the point is a rocker or curved frame 7 which is the fulcrum of the lever when in operation and is braced by a crosspiece 8. A forked hook 9 is pivoted to the lever 5 by means of the bolt 10 and is adjustable by means of the perforations 11 in the hook and the holes 12 in the lever. This hook is adapted to work in conjunction with the point 6 and engage the opposite side of the stump or root and grips it firmly when the upper end of the lever 5 is drawn down and when the force is exerted on the rocker 7 the point and hook are not only drawn closer together more firmly gripping the stump or root, but an upward movement is produced by the eccentric action of the rocker and the root or stump is drawn from the ground. In case the lever is of greater height than the operator a link 13 with hand socket 14 is attached to the upper end and greater leverage is secured by applying the force at that point.

It is obvious that other means may be resorted to, to secure increased leverage and that various modifications may be resorted to in the construction and arrangement of the details of the invention without departing from the essential features above described.

What I claim as new and desire to secure by Letters Patent is:

In a stump and root puller, the combination with a lever having spaced apertures at one end, of a forked hook having a bifurcated end and apertures in the bifurcations thereof, a bolt adapted to be inserted in any of the apertures of the bifurcations and lever for varying the effective length of the hook and the position of the fulcrum point on the lever, and a rocker on the lower end of the lever, said rocker consisting of a metal strip curved into an approximately semi-circular portion and a straight portion forming a brace for the free extremity of the semi-circular portion.

In testimony whereof, I affix my signature in presence of two witnesses.

CHARLES BITTNER.

Witnesses:
ALFRED E. SCHAEFER,
BERTHA SCHAEFER.